United States Patent Office 2,788,862
Patented Apr. 16, 1957

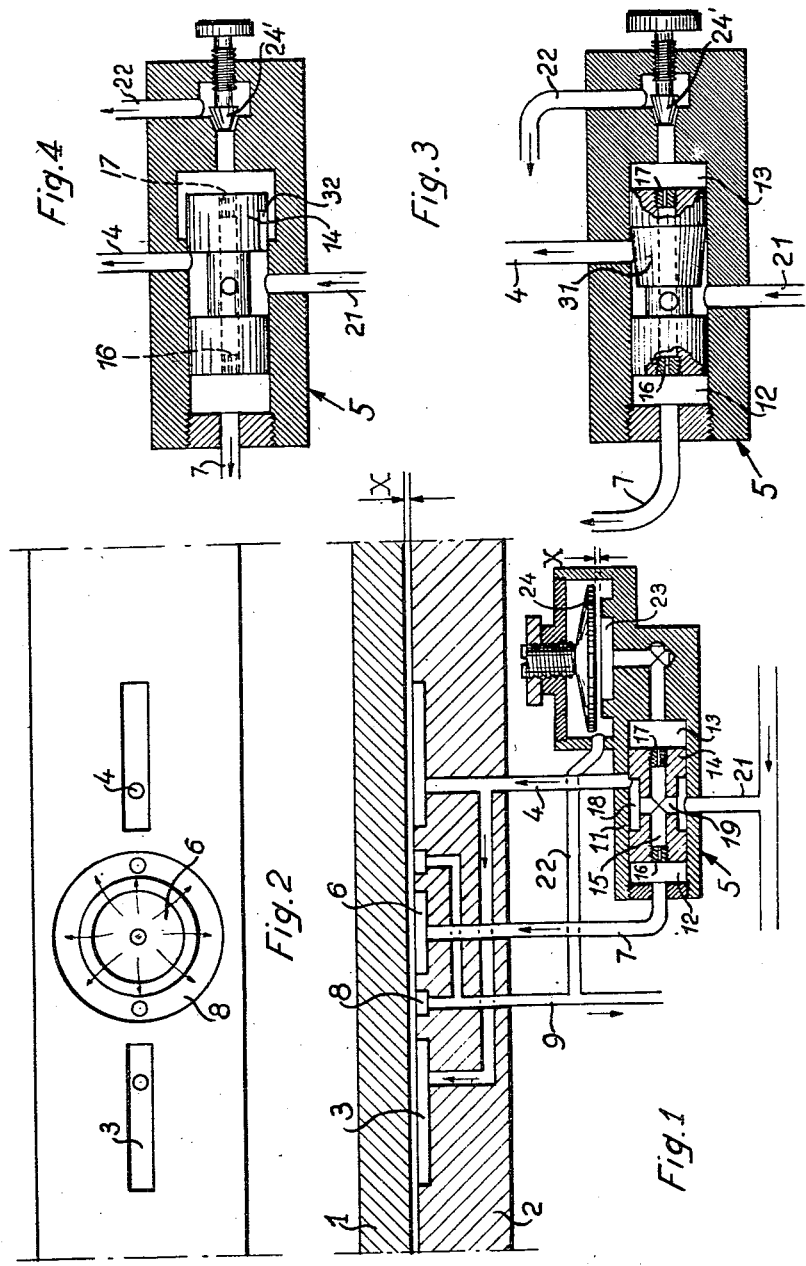

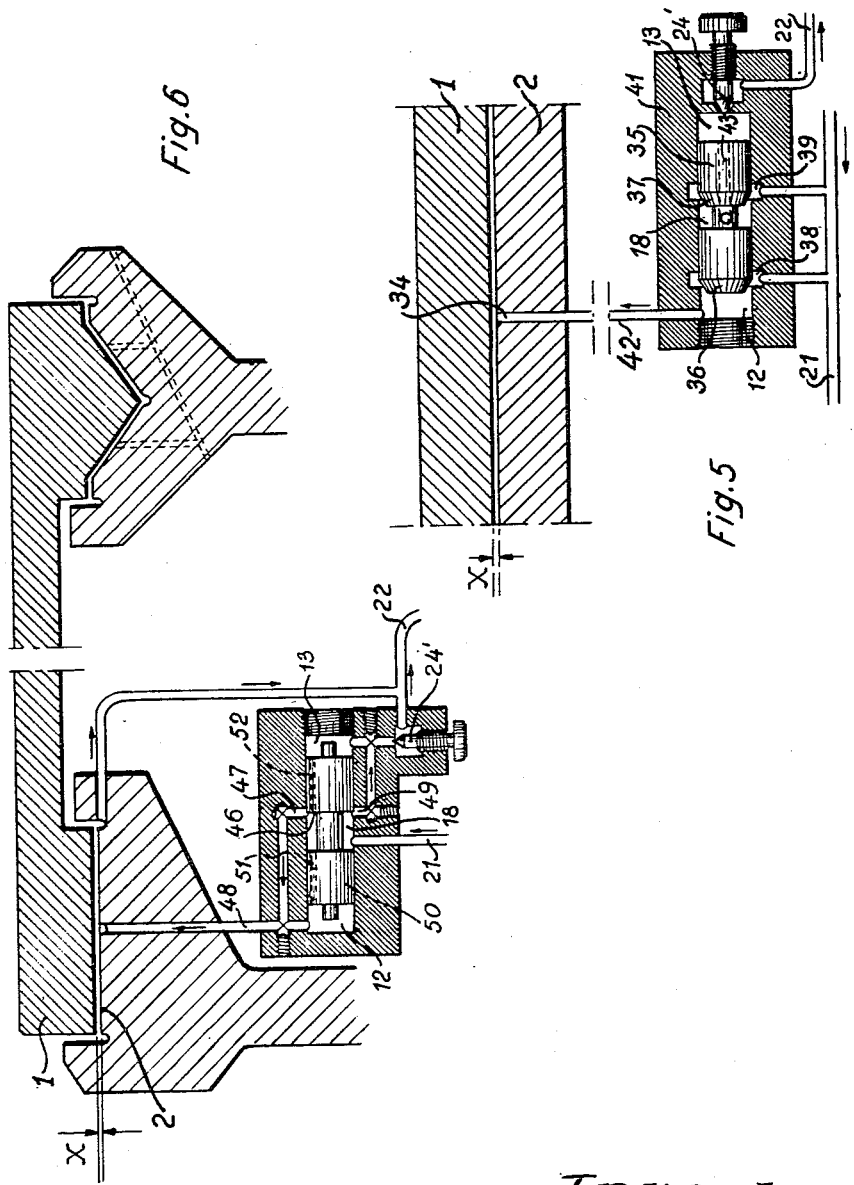

2,788,862

PRESSURE LUBRICATING SYSTEM FOR MA-
CHINE-TOOL SLIDES OR THE LIKE

Jean L. Langer, Sevres, France, assignor to Gendron
Freres S. A., Villeurbanne, France, a company of
France Application December 12, 1955, Serial No. 552,538

Claims priority, application France December 18, 1954

11 Claims. (Cl. 184—6)

This invention relates to a system for lubricating machine-tool slides, or the like, with a lubricating medium under pressure or, more generally, for feeding a separating space between closely spaced surfaces of two parts, mounted for relative sliding motion, with a pressure fluid capable of avoiding any metal-to-metal contact therebetween.

In the following specification, such a pressure fluid will be called "oil" or "pressure oil" for the sake of simplification.

The main object of the invention is to provide a lubricating system of this type, capable of automatically maintaining, between the two relatively slidable surfaces, a constant clearance of predetermined value, by circulating, through the separating space, a continuous flow of pressure oil from a suitable source and by automatically regulating the rate of flow through said space in response to variations of said clearance on either side of said value.

Before disclosing the details of the invention, it will be first defined what is meant by "hydraulic resistance of a circuit," in the acceptation given to this expression in the present specification as well as in the appended claims.

The hydraulic resistance of a circuit is defined by the ratio $pl/s$ in which $p$ is a coefficient varying as a function of the viscosity of the fluid circulating through said circuit, as well as according to the configuration of the latter; $l$ is the length of the circuit, and $s$ is a function of the cross-section of said circuit.

This general formula is true, in particular, for small duct lengths and, still more particularly, for flow-restricting means such as throttlings or nozzles.

To obtain the desired result, viz. a constant clearance between the relatively slidable surfaces, there are provided, according to the invention:

A reference circuit that does not pass through the separating space fed from a source of pressure oil and the hydraulic resistance of which has a predetermined value;

A control circuit passing through the separating space between the relatively slidable surfaces, also fed from said pressure oil source, and having the same hydraulic resistance as the said reference circuit, when the clearance between said surfaces has the desired value;

Flow-restricting means, such as nozzles, or throttlings in both said circuits, the hydraulic resistances of said means permanently having equal values;

A main supply circuit or lubricating circuit to feed the separating space with pressure oil from said source;

Pressure-responsive flow-adjusting means incorporated in said lubricating circuit to regulate the rate of flow therethrough and, hence, through said space, said means being subjected to the difference between the pressures downstream of the flow-restricting means in the reference and control circuits, so as to increase the rate of flow through the lubricating circuit as the pressure downstream the flow-restricting means incorporated in the control circuit increases, and vice-versa.

It will be easily understood that, in these conditions, the flow-adjusting means is in equilibrium when the pressures downstream of both flow-restricting means are equal, which implies the same rate of flow through both control and reference circuits.

Now, since the hydraulic resistance of the reference circuit has a predetermined value, the equilibrium will take place when the hydraulic resistance of the control circuit has a corresponding well-defined value and since the only variable of said control circuit is the clearance between the two relatively sliding surfaces, the said clearance will be maintained at a well-defined value whatever may be the viscosity of the oil, since said viscosity intervenes rigorously to the same extent in both reference and control circuits.

Another object of the invention is to provide a lubricating system of the type described, wherein the hydraulic resistance of the reference circuit is adjustable e. g. by means of an adjustable valve incorporated in said circuit. Owing to this arrangement, the constant value of the clearance may be adjusted at will. For each setting of the reference circuit, the hydraulic resistance of the control circuit will become equal to that of said reference circuit if the clearance varies accordingly.

A more particular object of the invention is to design the two above mentioned flow-restricting means so that they simultaneously undergo equal variations of their cross-sections from a position in which they are both completely closed to another position corresponding to their maximum opening.

A further object of the invention is to constitute the said simultaneously and equally variable flow-restricting means in combination, by the two terminal edges of a same piston and the respective edges of two ports provided in the inner wall of the cylinder in which said piston is slidably mounted, the spacing between said piston edges being equal to that of said port edges.

Another object of the invention is to constitute the two variable flow-restricting means permanently having equal hydraulic resistances, by combining one single edge of a piston slidably mounted in a cylinder with two ports provided in the wall of said cylinder.

In a simplified embodiment of the invention, the lubricating circuit itself is so arranged as to constitute the control circuit. This arrangement requires but a very small number of ducts; however, it does not permit maintaining the clearance rigorously constant when the relative speed of the lubricated surfaces varies, in particular in reciprocating motions.

Another object of the invention is to maintain a rigorously constant clearance, in spite of possible variations of said relative speed, by connecting the control circuit independently of the lubricating circuit with a recess opening in the separating space between the relatively slidable surfaces.

Still another object of the invention is to design the above mentioned flow-adjusting means in the shape of a piston freely slidable in a cylinder and one edge of which cooperates with a port in the cylinder wall for adjusting the rate of flow through the lubricating circuit while the two terminal faces of said piston are respectively subjected to the pressures downstream the two flow-restricting means.

In the last case, if said flow-restricting means are constituted by nozzles of constant cross-section, the same may be incorporated in the terminal walls of the said piston, to be fed through inner passages provided in the latter and permanently communicating with a lateral inlet fed with pressure oil and located between the ends of the piston.

When the flow-adjusting means are constituted, as shown, by the combination of a piston edge with an associated port in the cylinder wall, there is preferably provided a small auxiliary duct of minute cross-section establishing a communication between the source of pressure oil and that face of said piston which is associated with the control circuit, said minute duct having for its purpose to permit building-up of pressure on the said piston face, to thereby bring said piston back into a position in which the port feeding the lubricating circuit is partly or completely open after having been completely closed.

Preferred embodiments of the invention will be hereinafter described with reference to the accompanying drawings, given merely by way of example and in which:

Figure 1 is a longitudinal sectional view of an embodiment of the lubricating system, according to the invention, used in a machine-tool between a sliding table and the machine bed.

Figure 2 is a plane view of the openings and recesses of the machine bed slideway.

Figures 3 and 4 are longitudinal sectional views of two modifications of the flow-adjusting means of Figure 1.

Figure 5 shows a simplified alternative embodiment of Figure 1, and

Figure 6 is a longitudinal sectional view of a particular embodiment of a device operating on the same principle as that of Figure 5.

Referring first to Figure 1, there is shown at 1 a machine-tool table, such as the table of a machine 4 for rectifying cylinders of rolling-mills, said table being mounted for reciprocating motion on slideways. The slideway 2 is provided with a plurality of spaced grooves 3 for admitting lubricating oil into the separating space between the relatively slidable surfaces (see also Figure 2). The grooves 3 are fed through the duct 4 from flow-adjusting means constituted, in the example shown, by a distributor 5, and described in detail hereinunder. A cylindrical control recess 6 is provided in the slideway 2, between the two oil grooves 3. The said recess also communicates with the distributor 5 through a duct 7. The cylindrical recess 6 is surrounded by an annular groove 8 provided in the slideway 2 for returning the oil discharged from the control recess to the oil reservoir through a duct 9. In other words, the annular groove 8 is at atmospheric pressure.

The distributor 5 comprises a hollow cylinder 11, the inner space of which is separated into two compartments 12, 13 by a free piston 14. An axial passage 15 extending between the two terminal faces of the piston 14 contains, at its ends, two similar nozzles 16 and 17, respectively, constituting, in this example, the above mentioned flow-restricting means.

An annular groove 18, provided in the mid-portion of the cylindrical surface of the piston 14, communicates with the axial passage 15 through radial ports 19 (two in the example shown). A main feeding duct 21 supplying oil under constant pressure leads to the inner space of the cylinder 11, within the inner groove 18 of the piston, so as to permanently feed said groove in any position of piston 14. The duct 4, feeding the oil grooves 3, communicates with the inner space of the cylinder 11, but in a zone located in the vicinity of one of the edges of the annular groove 18, so that the said edge varies the cross-section of the opening of the duct 4 in cylinder 11, as described hereafter.

On the other hand, the duct 7 feeding the control recess 6 communicates with the compartment 12 while the compartment 13 is interconnected with the return duct 9 through a pipe 22 under the control of a throttling constituted by the annular edge of a cylindrical recess 23 cooperating with the lower face of a disk 24. In the example shown, the spacing between said annular edge and said disk is adjustable. For the sake of clearness, the throttling 23—24 has been shown as accurately reproducing, in shape and size, the throttling comprised between the annular edge of the control recess 6 and the table 1.

This device operates as follows:

It will be first assumed that the system is in a condition of steady operation and, furthermore, that the clearance X between the table 1 and the slideway 2 is equal to the spacing between the disk 24 and the annular edge of the recess 23. Oil, supplied by the main duct 21, flows at the same rate through both nozzles 16 and 17, since the same are respectively incorporated in circuits having the same hydraulic resistances. The losses of pressure in both nozzles are, therefore, equal to each other and the pressures in both compartments 12 and 13 are also equal. The free piston 14 is thus in equilibrium, under the opposed actions of said equal pressures, so that said piston opens the inlet to the duct 4 with a constant cross-section. The flow of oil through the separating space between the relatively slidable surfaces, is constant and, if the conditions of operation of the machine in the vicinity of the control recess 6 are not modified, the clearance X will not vary.

It will be noted that the discharge rate of the nozzle 17 is determined by the cross-section of the passage under the disk 24, while the rate of discharge of the nozzle 16 is determined by the cross-section of the passage between the table 1 and the slideway 2, within the annular zone separating the control recess 6 from the return groove 8.

Due to the concentric relation between the control recess 6 and the return groove 8, and owing to the comparatively important deepness of the recess 6 with respect to the value of the clearance, it will be easily understood that the loss of pressure through the area comprising said recess and annular groove does not depend upon the direction and speed of displacement of the table 1 on the slideway 2.

Now, if for any reason, such as, for example, an increase of the pressure exerted by the table on its slideways, the clearance X tends to be reduced, the cross-section through which the oil passes between the controll recess 6 and the return annular groove 8 also tends to decrease. As a result, the pressure in the compartment 12 fed by the nozzle 16 increases. On the other hand, the conditions of circulation of the fluid through the circuit comprising the nozzle 17 and the adjustable disk 24 remain unchanged, so that the pressure in the compartment 13 does not vary. Since the pressure in the compartment 12 thus becomes higher than that in the compartment 13, the free piston 14 is displaced towards the latter (towards the right in Figure 1), thus increasing the cross-section of the inlet to the duct 4. The rate of flow through said duct is thus increased until the clearance X has reassumed its desired value. The resistance opposing the discharge of oil from the control recess 6 drops so that the pressure in the compartment 12 is made equal anew to the pressure in the compartment 13.

It is clear that if the clearance X had been increased, a similar but inverted succession of phenomena would have taken place, the piston 14 being shifted towards the left (in Figure 1), and reducing the cross-section of the inlet to the duct 4, until the clearance would have reassumed its normal value.

Briefly, there are thus provided two hydraulic circuits fed from a same source of pressure oil, said circuits respectively passing through the two nozzles 16 and 17 of equal hydraulic resistances. The piston is in equilibrium and the pressures acting on its two faces are equal to one another, while the losses of pressure in both nozzles 16 and 17 are the same, which implies a same rate of flow through both circuits or, in other words, equal values of the hydraulic resistances of said circuits. Since the recess 23, incorporated in the reference circuit, rigorously reproduces, in the example shown, the control recess 6 of the slideway, the said hydraulic resistances may be equal only if the clearance X is rigorously equal to the spacing between the disk 24 and the annular edge of the recess 23.

There is thus obtained an automatic regulation of the flow of oil through the separating space between the relatively slidable surfaces, whatever may be the variations of viscosity of the oil, since the same circulates in parallel through two circuits of same hydraulic resistance.

When the constant value, X, of the clearance is to be adjusted, it suffices to vary the spacing between the disk 24 and the edge of the recess 23.

The above described system still offers a further essential advantage, viz. an automatic interruption of the discharge of oil on the slideway, as soon as the table travels farther than the recess 6, as well as an automatic resetting of said discharge as the table reaches said recess again. This results from the fact that, as soon as the table 1 no more covers the control recess 6, the pressure in the duct 7 and compartment 12 suddenly drops, so that the piston 14 completely obturates the duct 4. The oil grooves 3 are, thus, no more supplied with oil. However, the nozzzle 16 is further fed with oil, so that, as soon as the table once more covers the recess 6, the pressure immediately builds up in the compartment 12 and pushes the piston 14 back into its regulating zone of action, so that oil is fed again to the slideways.

As explained above, for the sake of clearance, the same conditions have been reproduced, in the example shown, for the recesses 6 and 23. It will be easily understood that, in practice, the disk 24 will be conveniently substituted by a more simple device such as, for example, a needle valve capable of reproducing, with a sufficient approximation, the hydraulic resistance constituted by the restricted passage between the lower face of the table and the annular edge of the control recess 6. Such a needle valve 24' has been illustrated in the alternative embodiments shown in Figures 3 to 6.

The lubricating system according to the invention requires, to be stable, a considerable degree of damping. In these conditions, the above described piston shouldering, adjusting the cross-section of the inlet into duct 4, is preferably replaced by a frusto-conical member of low conicity, the action of which is strongly demultiplied with respect to the stroke of the piston. Such a frusto-conical member is shown in Figure 3 at 31. Otherwise, the modification of Figure 3 is similar and operates in the same manner as the embodiment of Figure 1. It is also possible to improve the stability of the system by allowing a slight decrease of the clearance when the stress exerted by the table 1 on the slideways 2 increases. This result may be easily obtained by modifying the action of the nozzle 17, for example, by disposing, in parallel therewith, another nozzle, e. g. in the shape of a longitudinal groove 32 (see Figure 4) provided in the wall of the piston 14. It may be seen that the length of the additional nozzle 32, thus obtained, varies according to the position of the piston 14. As the pressure of the flow of oil through the space between the relatively slidable surfaces increases, the piston 14 tends, as previously, to increase the rate of flow through the lubricating circuit, but, in the same time, the length of the additional nozzle 32 is increased, which increases the pressure downstream of the nozzle 17, thus retardating the displacement of the piston for damping purposes.

When it is not necessary that the clearance X be absolutely independent of the linear speed of the sliding part and, in particular, when the said speed is low so that its variations are small, it is possible to design, on the same principle, an alternative device, wherein the oil grooves are used as the control recess.

A device of this type is diagrammatically shown in Figure 5, wherein the reference 1 designs, as previously, a part slidable on a slideway 2, the oil grooves forming the control recess being shown at 34.

The free piston 35 has two frustro-conical edges 36, 37, respectively cooperating with corresponding edges of two annular grooves 38, 39 provided in the cylindrical inner space of the distributor. The two above mentioned piston edges constitute, in combination with the relevent annular groove edges, two throttlings, the cross-sections of which simultaneously vary according to the position of the piston, said throttlings being both fed from the main constant pressure oil supply duct 21. The throttling 38 feeds the compartment 12 from which oil is sent into the separating space between the relatively slidable surfaces through the duct 42, while the throttling 39 feeds the compartment 13 through an inner passage 43 of the piston extending between the peripheral groove 18 of the same and its terminal face located in the compartment 13. The oil from the compartment 13 is evacuated under the control of an adjustable needle valve 24' as previously.

The operation of this device is similar to that of the previously described embodiments. Starting from the steady rate of operation, if, for example, the clearance X decreases, the cross-section through which the oil passes also decreases and the pressure in the compartment 12 increases, while the pressure in the compartment 13 remains constant. The piston is, thus, displaced towards the compartment 13 and, further opens the throttlings 38 and 39. The rate of flow of the oil through the duct 42 increases until the equilibrium is, once more, obtained i. e. until the clearance has reassumed its constant value determined by the setting of the needle valve 24'.

While, in the previously described embodiment, both nozzles 16 and 17 were structurally similar and kept equal hydraulic resistances owing to their having fixed cross-sections, in the device of Figure 5, both throttlings 38 and 39 permanently have equal resistances owing to the fact that, starting from complete closing, they simultaneously open to the same extent, while their variations in either directions always remain equal to one another.

Thus, the losses of pressure in both compartments 12 and 13 vary, on the one hand, under the action of piston 35 and, on the other hand, in response to variations of the spacing between the table and its slideways. However, the losses of pressure resulting from the displacements of the piston have no influence whatever on the regulation since they vary, simultaneously, to the same extent and in the same direction. As a consequence, only the variations of the losses of pressure resulting from the variations of the clearance are capable of acting upon the flow-adjusting device, which is the purpose aimed at.

The stability of this alternative system depends on the relation between the spacing of the grooves 38 and 39 and that of the edges 36 and 37 of the piston.

It may be arranged, by opening the throttling 38 before the throttling 39, that the variation of hydraulic resistance of the latter is more important than that of the former for a same displacement of the piston.

This embodiment requires but one single passage leading to the slideway as shown at 34. Furthermore this embodiment permits using the oil pressure with a maximum efficiency, since the cross-section of the throttling 38 increases with the rate of flow. However, this arrangement has the drawback of requiring an additional flow, viz. that of the throttling 39 equal to the rate of flow through the throttling 38 and which is not used for lubricating purposes. Finally, for a same adjustment of the needle valve 24', the oil pressure at 34, slightly varies as a function of the relative speed of the relatively slidable surfaces.

Another alternative embodiment is diagrammatically shown in Figure 6. It differs from the preceding one in that the two edges of the piston 50, each constituting the controlling element of the two variable throttlings, are replaced by one single edge 46. The said edge acts as a first throttling in cooperation with the duct 47 leading from the inner space of the distributor and communicating with the lubricating duct 48 as well as with the compartment 12. The edge 46 further acts as a second throttling in cooperation with another duct 49 communicating with the compartment 13 and the needle valve 24'.

In this embodiment, the piston 50 is provided with two narrow passages 51 and 52 shown in dotted lines in the drawing and establishing a communication between the annular groove 18 of the piston 50 and the compartments 12 and 13, respectively. Said bores have but a minute diameter to ensure but a negligible flow of oil, just sufficient to build up a pressure when required, as explained hereunder.

The operation of this device is similar to that of Figure 5. The pressure oil incoming through the duct 21 flows, on the one hand, through the throttling 47 to feed the slideway and, on the other hand, through the throttling 49 and the needle valve 24' from which it escapes towards the reservoir. The piston 50 exerts its adjusting action on the throttling 47—49 in response to a difference between the pressures in the end compartments 12 and 13 as previously.

The advantage of this embodiment with respect to that of Figure 5 is to comprise but one single distributing edge 46. It is, therefore, more easy to machine than the devices with two distributor edges, such as that of Figure 5 which require machining of both edges of the piston as well as machining of the distributor ports with rigorously equal spacings.

Moreover, if the table 1 moves away from the area in which the main lubricating conduct 48 opens in the slideway, it may be seen that the pressure in the compartment 12 of the flow-adjusting device immediately drops so that the piston 50 completely obturates in particular the conduct 47. If the minute bore 51 of the piston were not divided, no pressure would be built up in the compartment 12 when the table is brought back into a position wherein it covers the upper end of the lubricating duct 48 again, and the piston 50 would remain definitively locked in the position, wherein it completely closes the duct 47. However, owing to the presence of the bore 51, even when the piston has obturated the duct 47, a very small flow further passes through said bore towards the lubricating duct 48. As a result, as the table covers the upper end of said duct again, the pressure in compartment 12 is capable of building up immediately in the oil brought by this small flow, however reduced, to urge the piston back towards the compartment 13, i. e. in the direction corresponding to the opening of the throttlings 47—49. The clearance X then automatically reassumes its constant value determined by the setting of the needle valve 24'. There are, thus obtained not only an interruption of the oil discharge, as soon as the table moves away from the lubricating port, but also an automatic resuming of the lubrication as soon as the table covers said port again.

The other small bore 52 does not participate to this result, its only purpose being merely to balance the action of the other bore 51, so as to avoid any perturbation in the operation.

In all embodiments described above, only a small area of the slideway has been shown. In practice, it is obviously advantageous to provide several feeding and controlling devices for regulating the lubrication, spaced along the slideways. Machine parts such as tables, for example, are not rigorously rigid and the presence of such a plurality of devices according to the invention permits correcting deformations, if any, of said parts. The accuracy of the device according to the invention is remarkable; it permits maintaining a clearance constant with an approximation of one micron for example. It will be easily understood that such a high degree of accuracy permits correcting flexure deformations of tables, often reaching a considerable number of microns.

In a general manner, while there has been, in the above description, disclosed what is deemed to be practical and efficient embodiments of the invention, it should be well understood that it is not wished to be limited thereto as there might be changes made in the arrangement, disposition and form of the parts, without departing from the scope of the present invention.

In particular, in the examples described and shown, it has been assumed that the slideways were rectilinear and flat slideways, or V shaped slideways as shown in Figure 6, but it is obvious that the invention may be used for any kind or shape of slideways such as, for example, an annular slideway for a vertical lathe plate.

Moreover, while one embodiment shows flow-adjusting means comprising two nozzles of constant hydraulic resistances (Figure 1) in combination with a device comprising a control circuit separate from the lubricating circuit, another embodiment (Figure 6) showing the combination of the two throttlings, the hydraulic resistances of which vary simultaneously and in the same manner with a device comprising a control circuit formed by the lubricating circuit, these combinations might be interchanged easily within the scope of the invention.

What is claimed is:

1. In a mechanism comprising a part having a surface slidably movable relatively to an adjacent surface of another part with a separating space therebetween, a device for circulating pressure fluid through said separating space to maintain between said surfaces a constant clearance of predetermined value, said device comprising, in combination, a source of pressure fluid, a main supply circuit passing through said separating space, a reference circuit having a predetermined resistance, a control circuit passing through said separating space and having the same hydraulic resistance as said reference circuit when said clearance has said value, means to circulate pressure fluid from said source through said main supply, reference and control circuits, first flow-restricting means incorporated in said reference circuit, second flow-restricting means incorporated in said control circuit, the hydraulic resistances of said first and second flow-restricting means being permanently equal to one another, and flow-adjusting valve means responsive to the difference between the pressures downstream of said first and second flow-restricting means to respectively increase and decrease the rate of flow through said main supply circuit when the pressure downstream of said second flow-restricting means is respectively higher and lower than the pressure downstream of said first flow-restricting means.

2. A pressure fluid circulating device according to claim 1, wherein the hydraulic resistance of said reference circuit is adjustable to, thereby, permit modifying the constant clearance to be maintained between said surfaces.

3. A pressure fluid circulating device according to claim 2, comprising a needle valve incorporated in said reference circuit to adjust its hydraulic resistance.

4. A pressure fluid circulating device according to claim 1, wherein said first and second flow-restricting means are constituted by two throttlings, means being provided to vary the cross-sections of said throttlings simultaneously and according to the same law, from a position wherein both of said throttlings are completely closed to a position wherein their opening is a maximum.

5. A pressure fluid circulating device according to claim 4, wherein said throttlings of variable cross-sections are constituted, in combination, by two edges of a same piston slidably mounted in a cylinder and by two ports provided in the inner wall of said cylinder on either side of said piston, the distance between said edges being equal to the spacing between the axes of said ports.

6. A pressure fluid circulating device according to claim 4, wherein said throttlings of variable cross-sections are constituted, in combination, by one edge of a piston slidably mounted in a cylinder and by two identical ports provided in the wall of said cylinder on either side of said piston, said ports having such relative positions with respect to said piston edge as to be similarly acted upon thereby.

7. A pressure fluid circulating device according to claim 1, wherein said main supply circuit itself is so arranged as to constitute the control circuit.

8. A pressure fluid circulating device according to claim 1, wherein said control circuit communicates with said separating space independently of said lubricating circuit.

9. A pressure fluid circulating device according to claim 1, wherein said control circuit communicates with said separating space independently of said lubricating circuit, and wherein said flow-adjusting valve means are constituted, in combination, by a piston freely slidable in a cylinder and a port in the wall of said cylinder and incorporated in said lubricating circuit, said port being adapted to be controlled by one edge of said piston and the terminal faces of the latter being respectively subjected to said pressures downstream of said first and second flow-restricting means.

10. A pressure fluid circulating device according to claim 1, wherein said control circuit communicates with said separating space independently of said lubricating circuit, wherein said flow-adjusting valve means are constituted, in combination, by a piston freely slidable in a cylinder and a port in the wall of said cylinder and incorporated in said lubricating circuit, said port being adapted to be controlled by one edge of said piston and the terminal faces of the latter being respectively subjected to said pressures downstream of said first and second flow-restricting means, and wherein said first and second flow restricting means are constituted by two nozzles of constant cross-sections inserted in said piston terminal walls, the feeding of said nozzles being ensured by inner passages through said piston, a peripheral groove in said piston communicating with said passages and a port in said cylinder wall within said groove and communicating with said pressure fluid source.

11. A pressure fluid circulating device according to claim 1, wherein said flow-adjusting valve means comprise a piston slidably mounted in a cylinder having a first compartment in communication with said control circuit and a second compartment in communication with said reference circuit, a bore of minute cross-section in said piston, communicating with said first compartment, and fluid conducting means to establish a permanent communication between said bore and said pressure fluid source.

References Cited in the file of this patent

UNITED STATES PATENTS 2,692,803     Gerard _____ Oct. 26, 1954

FOREIGN PATENTS 851,429     Germany _____ Oct. 6, 1952

OTHER REFERENCES

Product Engineering, 1953 Annual Handbook, pages J4 and J5.